United States Patent
Morisaku et al.

(10) Patent No.: US 9,716,255 B2
(45) Date of Patent: Jul. 25, 2017

(54) BATTERY MODULE

(71) Applicant: KABUSHIKI KAISHA TOYOTA JIDOSHOKKI, Aichi-ken (JP)

(72) Inventors: Naoto Morisaku, Kariya (JP); Hiromi Ueda, Kariya (JP); Takayuki Kato, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 15/307,983

(22) PCT Filed: Apr. 21, 2015

(86) PCT No.: PCT/JP2015/062077
§ 371 (c)(1),
(2) Date: Oct. 31, 2016

(87) PCT Pub. No.: WO2015/170580
PCT Pub. Date: Nov. 12, 2015

(65) Prior Publication Data
US 2017/0054116 A1    Feb. 23, 2017

(30) Foreign Application Priority Data

May 7, 2014    (JP) .................................. 2014-095975

(51) Int. Cl.
*H01M 4/00*    (2006.01)
*H01M 2/10*    (2006.01)

(52) U.S. Cl.
CPC ........... *H01M 2/10* (2013.01); *H01M 2/1016* (2013.01); *H01M 2/1077* (2013.01)

(58) Field of Classification Search
CPC ..... H01M 2/10; H01M 2/1016; H01M 2/1077
See application file for complete search history.

(56) References Cited

U.S. PATENT DOCUMENTS

2012/0114999 A1*   5/2012   Park ................... H01M 2/0434
                                                        429/99
2012/0129041 A1    5/2012   Komazawa
(Continued)

FOREIGN PATENT DOCUMENTS

JP    2012-109152    6/2012
JP    2012-160347    8/2012
(Continued)

OTHER PUBLICATIONS

Written Opinion of the International Searching Authority, along with English-language translation thereof, in PCT/JP2015/062077 dated Jul. 7, 2015.
(Continued)

*Primary Examiner* — Raymond Alejandro
(74) *Attorney, Agent, or Firm* — Greenblum & Bernstein, P.L.C.

(57) ABSTRACT

A battery module includes battery cells, a cover, a conductor, first and second end plates, an elastic body, and a fixing plate. The first and second end plates hold the battery cells from the opposite ends in the aligning direction. The elastic body is arranged between the second end plate and the battery cell that is adjacent to the second end plate. The fixing plate is arranged between the elastic body and the battery cell that is adjacent to the elastic body. The elastic body is configured to be elastically deformed to absorb a load applied to the first and second end plates as the battery cells expand. The fixing plate is fixed to the cover and configured to move with the cover in the aligning direction of the battery cell as the battery cells expand.

3 Claims, 7 Drawing Sheets

(56) References Cited

U.S. PATENT DOCUMENTS

| | | | |
|---|---|---|---|
| 2012/0148890 A1* | 6/2012 | Goto | H01M 2/1077 |
| | | | 429/90 |
| 2013/0273404 A1 | 10/2013 | Ochi et al. | |
| 2013/0330579 A1* | 12/2013 | Ejiri | H01M 2/1061 |
| | | | 429/53 |
| 2014/0120407 A1* | 5/2014 | Hofer | H01M 2/206 |
| | | | 429/159 |
| 2014/0305698 A1* | 10/2014 | Ishikawa | H01M 2/1077 |
| | | | 174/72 B |
| 2014/0335393 A1 | 11/2014 | Wada et al. | |

FOREIGN PATENT DOCUMENTS

| | | |
|---|---|---|
| JP | 2013-69657 | 4/2013 |
| WO | 2012/057322 | 5/2012 |
| WO | 2013/084941 | 6/2013 |
| WO | 2014/024425 | 2/2014 |
| WO | 2014/034079 | 3/2014 |

OTHER PUBLICATIONS

International Search Report, along with English-language translation thereof, in PCT/JP2015/062077 dated Jul. 7, 2015.

* cited by examiner

BATTERY MODULE

TECHNICAL FIELD

The present invention relates to a battery module having a cover.

BACKGROUND ART

Some battery modules are equipped with a cover to prevent liquid or dust from collecting on the battery cells and to insulate and protect bus bar connecting portions between the terminals of the battery cells. Patent Document 1 discloses a battery module that has a bus bar cover for protecting the upper part of the battery module. The bus bar cover includes a conductor, which is connected to a battery cell and fixed to the bus bar cover.

PRIOR ART DOCUMENTS

Patent Documents

Patent Document 1: Japanese Laid-Open Patent Publication No. 2012-109152

SUMMARY OF THE INVENTION

Problems that the Invention is to Solve

The battery cells expand as they are used. Expansion of the battery cells can move the bus bar cover. Such movement of the bus bar cover is likely to apply stress on the conductors, and the conductors may be damaged, accordingly.

Accordingly, it is an objective of the present invention to provide a battery module that restrains a conductor from receiving stress.

Means for Solving the Problems

To achieve the foregoing objective and in accordance with one aspect of the present invention, a battery module is provided that includes a plurality of aligned battery cells, a cover, a conductor, a first end plate and a second end plate, an elastic body, and a fixing plate. Each battery cell has a terminal and a surface on which the terminal is provided. The cover faces the surfaces of the battery cells on which the terminals are provided. The conductor is connected to the battery cells and fixed to the cover. The first end plate and the second end plate hold the battery cells from opposite ends in an aligning direction of the battery cells. The elastic body is arranged between the second end plate and the battery cell that is adjacent to the second end plate. The fixing plate is arranged between the elastic body and the battery cell that is adjacent to the elastic body. The elastic body is configured to be elastically deformed to absorb a load that is applied to the first and second end plates as the battery cells expand. The fixing plate is fixed to the cover and is configured to move in the aligning direction of the battery cells together with the cover as the battery cells expand.

MODES FOR CARRYING OUT THE INVENTION

A battery module 10 according to one embodiment will now be described.

Figure 1:
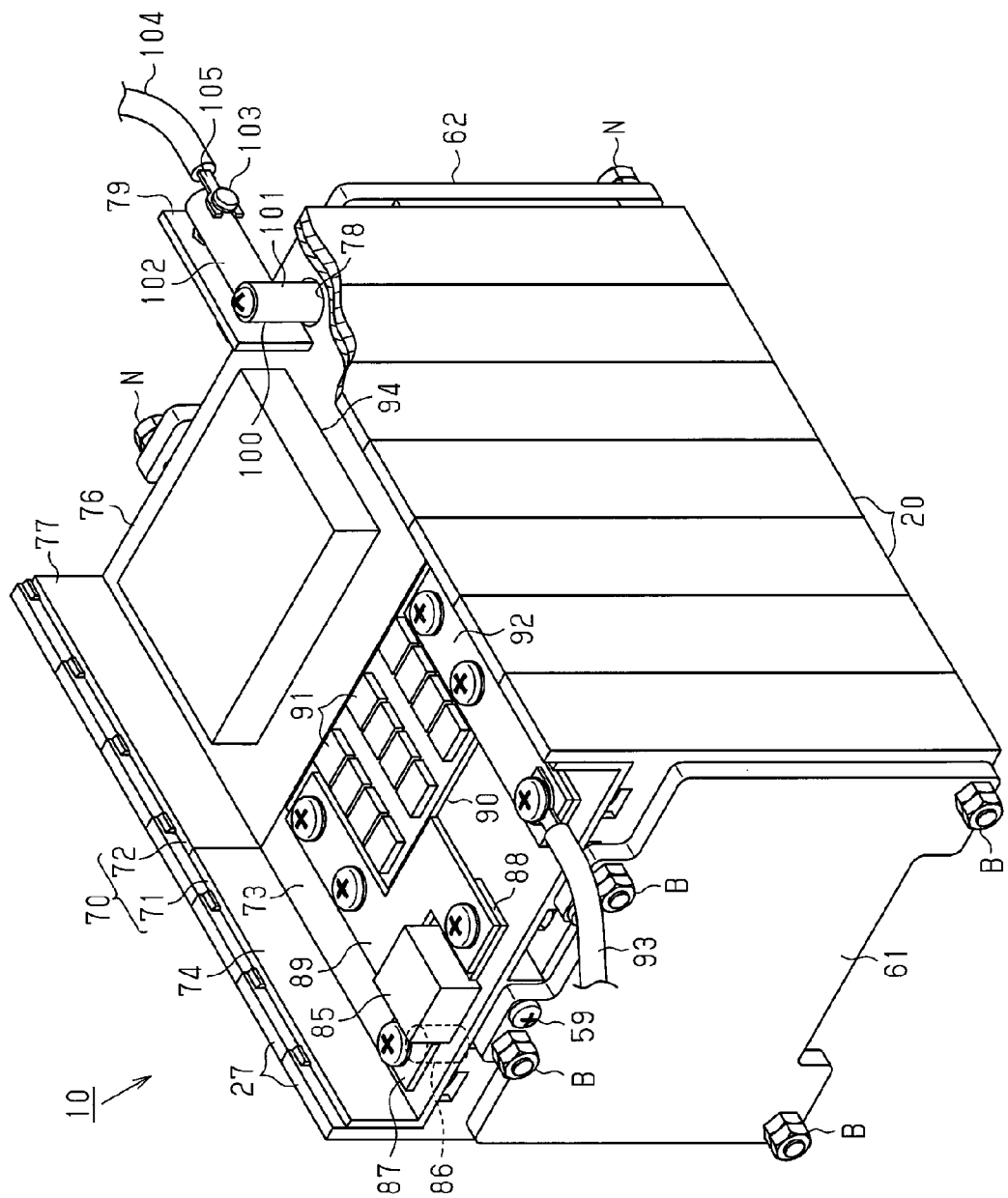
FIG. 1 is a perspective view illustrating a battery module according to one embodiment.
Figure 2:
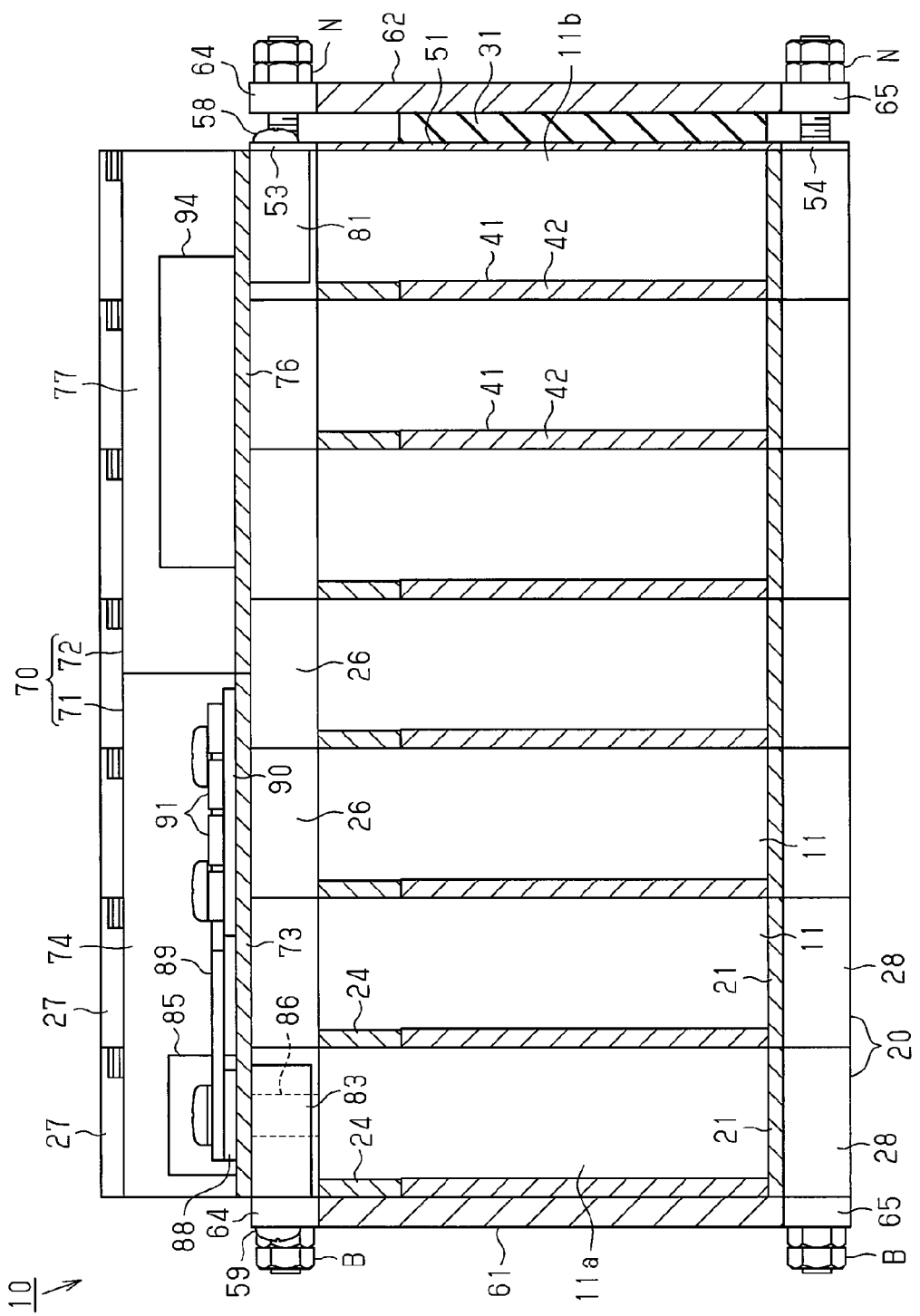
FIG. 2 is a cross-sectional view of the battery module shown in FIG. 1.

As shown in FIGS. 1 and 2, the battery module 10 includes aligned battery cells 11 and heat transfer plates 41. The battery cells 11 and the heat transfer plates 41 are arranged alternately. Each of a plurality of battery holders 20 holds one battery cell 11 and one heat transfer plate 41. The battery cells 11 and the heat transfer plates 41 are held by a first end plate 61 and a second end plate 62, which are arranged at the opposite ends in the aligning direction of the battery cells 11. Hereinafter, one of the battery cells 11 at the opposite ends in the aligning direction is defined as a first battery cell 11a, while the other one is defined as a second battery cell 11b. The first battery cell ha is adjacent to the first end plate 61, and the second battery cell 11b is adjacent to the second end plate 62.

As shown in FIG. 2, a flat board-shaped fixing plate 51 and a flat board-shaped elastic body 31 are arranged between the second end plate 62 and the second battery cell 11b. Between the second end plate 62 and the second battery cell 11b, the fixing plate 51 is arranged closer to the second battery cell 11b, and the elastic body 31 is arranged closer to the second end plate 62. That is, the fixing plate 51 is arranged between the elastic body 31 and the second battery cell 11b, and the elastic body 31 is arranged between the second end plate 62 and the fixing plate 51. The elastic body 31 is made of an elastically deformable material such as rubber or plastic sponge.

Figure 3:
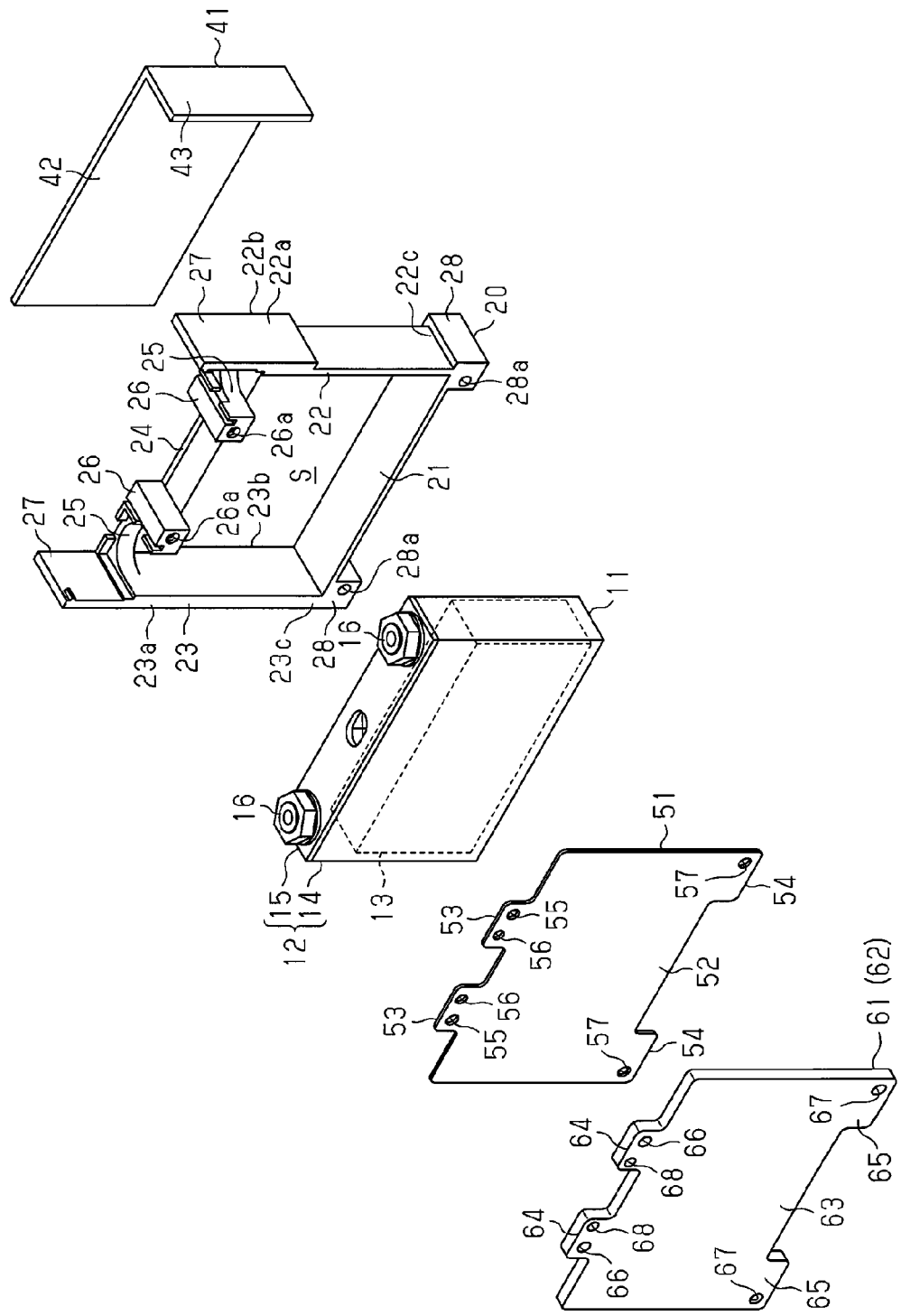
FIG. 3 is a perspective view illustrating a battery cell, a battery holder, a heat transfer plate, a fixing plate, and an end plate shown in FIG. 2.

As shown in FIG. 3, each battery holder 20 includes a rectangular flat board-shaped first covering wall 21. Rectangular flat board-shaped second and third covering walls 22, 23 are provided at the opposite ends in the longitudinal direction of the first covering wall 21. The second and third covering walls 22, 23 extend in the thickness direction of the first covering wall 21, in other words, in a direction perpendicular to the first covering wall 21. The region surrounded by the first covering wall 21, the second covering wall 22, and the third covering wall 23 serves as an accommodating portion S, in which a battery cell 11 is accommodated.

The second covering wall 22 has a first end 22a and a second end 22c in the longitudinal direction, which are on the opposite sides. The third covering wall 23 has a first end 23a and a second end 23c in the longitudinal direction, which are on the opposite sides. The first covering wall 21 is connected to the second longitudinal ends 22c, 23c of the second and third covering walls 22, 23. A rectangular flat board-shaped fourth covering wall 24 is connected to the first longitudinal ends 22a, 23a of the second and third covering walls 22, 23. The fourth covering wall 24 extends between first ends 22b, 23b in the transverse direction of the covering walls 22, 23. The thickness direction of the fourth covering wall 24 agrees with the transverse direction of the covering walls 22, 23. The second covering wall 22 and the third covering wall 23 face each other in the longitudinal direction of the fourth covering wall 24. The direction perpendicular to both the thickness direction and the longitudinal direction of the fourth covering wall 24 is the transverse direction of the fourth covering wall 24.

The fourth covering wall 24 has U-shaped terminal accommodating portions 25 in the vicinities of the opposite ends in the longitudinal direction. The terminal accommodating portions 25 open in the thickness direction of the fourth covering wall 24. The terminal accommodating portions 25 are formed continuously with the second and third covering walls 22, 23, respectively.

The fourth covering wall 24 has two quadrangular prism-like pillar members 26, each of which is adjacent to corresponding one of the terminal accommodating portions 25. Each pillar member 26 has an axis extending in the transverse direction of the covering walls 22, 23. Each pillar member 26 has an insertion hole 26a, which extends through the pillar member 26 along the axis of the pillar member 26.

Rectangular flat board-shaped guide portions 27 extend from the first longitudinal end 22a, 23a of the covering walls 22, 23 in the longitudinal direction of the second covering wall 22 and the third covering wall 23, respectively. The guide portions 27 face each other. Each guide portion 27 is integrated with the corresponding one of the covering wall 22, 23. Quadrangular prism-like legs 28 are provided at the second longitudinal ends 22c, 23c of the second covering wall 22 and the third covering wall 23, respectively. Each leg 28 has an axis extending in the transverse direction of the covering walls 22, 23. Each leg 28 has an insertion hole 28a, which extends through the leg 28 along the axis of the leg 28.

Each battery cell 11 includes a case 12 and an electrode assembly 13, which is accommodated in the case 12 and has a positive electrode and a negative electrode. The case 12 includes a rectangular tube-shaped case body 14, which has a bottom and an opening, and a lid member 15, which closes the opening of the case body 14. The lid member 15 has two terminals 16, that is, a positive terminal and a negative terminal. A connecting member for connecting the battery cells 11 together is connected to each terminal 16.

Each heat transfer plate 41 is formed by bending a metal plate into an L-shape. The heat transfer plate 41 includes a rectangular flat board-shaped main body 42 and a bend portion 43, which extends in the thickness direction of the main body 42 from one end in the longitudinal direction of the main body 42.

The fixing plate 51 has a rectangular flat board-shaped base portion 52. The base portion 52 has projections 53, 54, which extend in opposite directions from the ends in the transverse direction of the base portion 52. Specifically, two first projections 53 are provided at one of the ends in the transverse direction of the base portion 52, and two second projections 54 are provided at the other end.

The first projections 53 are located relatively close to the center in the longitudinal direction of the base portion 52, while being spaced from each other. Each first projection 53 has a first through-hole 55 and a second through-hole 56, which extend through the first projection 53 in the thickness direction. The distance between the first through-holes 55 is equal to the distance between the insertion holes 26a of the pillar members 26 of the battery holder 20.

The second projections 54 are provided at the opposite ends in the longitudinal direction of the base portion 52. Each second projection 54 has a third through-hole 57. The distance between the third through-holes 57 is equal to the distance between the insertion holes 28a of the legs 28 of the battery holder 20.

The first end plate 61 has a rectangular flat board-shaped plate base portion 63. The plate base portion 63 has two first plate projections 64 and two second plate projections 65. The first plate projections 64 extend in opposite directions from the opposite ends in the transverse direction of the plate base portion 63.

Each first plate projection 64 has a first plate through-hole 66, which extends through the first plate projections 64 in the thickness direction. The distance between the first plate through-holes 66 is equal to the distance between the insertion holes 26a of the pillar members 26 of the battery holder 20. Each first plate projection 64 also has a second plate through-hole 68, which extends through the first plate projections 64 in the thickness direction. Each second plate projection 65 has a third plate through-hole 67. The distance between the third plate through-holes 67 is equal to the distance between the insertion holes 28a of the legs 28 of the battery holder 20.

Figure 6:
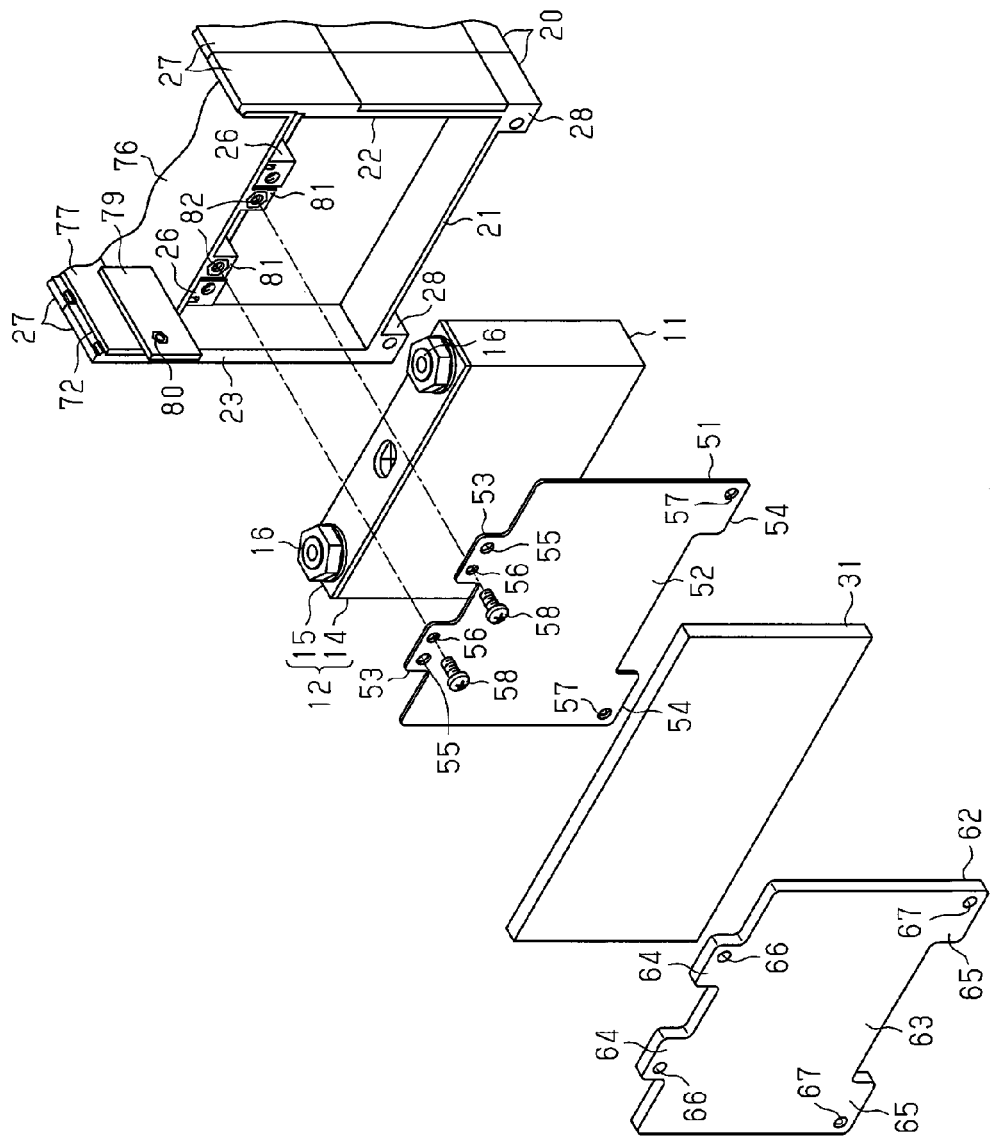
FIG. 6 is an exploded perspective view of the battery module, illustrating a manner in which the fixing plate and the second cover member are fixed.

As shown in FIG. 6, the second end plate 62 has the same shape as the first end plate 61 except that the second end plate 62 does not have the second plate through-holes 68. Thus, the same reference numerals are given to those parts of the second end plate 62 that are the same as the corresponding parts of the first end plate 61, and explanations are omitted.

As shown in FIG. 2, the battery cells 11, the heat transfer plates 41, the battery holders 20, the fixing plate 51, and the elastic body 31 are held by the first end plate 61 and the second end plate 62. Two bolts B are passed through the two plate through-holes 66 of the first end plate 61, the two insertion holes 26a of each battery holder 20, the two first through-holes 55 of the fixing plate 51, and the two plate through-holes 66 of the second end plate 62. Also, two bolts B are passed through the two plate through-holes 67 of the first end plate 61, the insertion holes 28a of each battery holders 20, and the two third through-holes 57 of the fixing plate 51. Each bolt B is passed through the corresponding one of the plate through-holes 66, 67 of the second end plate 62, and the end opposite to the head is threaded to a nut N. Accordingly, the first end plate 61 and the second end plate 62 receive load acting in the approaching direction, which causes the components between the end plates 61, 62 to be bound by the end plates 61, 62.

As shown in FIGS. 1 to 3, the battery module 10 includes a cover 70. The cover 70 faces the surfaces of the battery cells 11 on which the terminals 16 are provided, that is, the lid members 15, and is located between the guide portions 27 of the battery holders 20. The cover 70 includes a first cover member 71 and a second cover member 72. The first cover member 71 and the second cover member 72 are arranged in the aligning direction of the battery cells 11.

Figure 4:
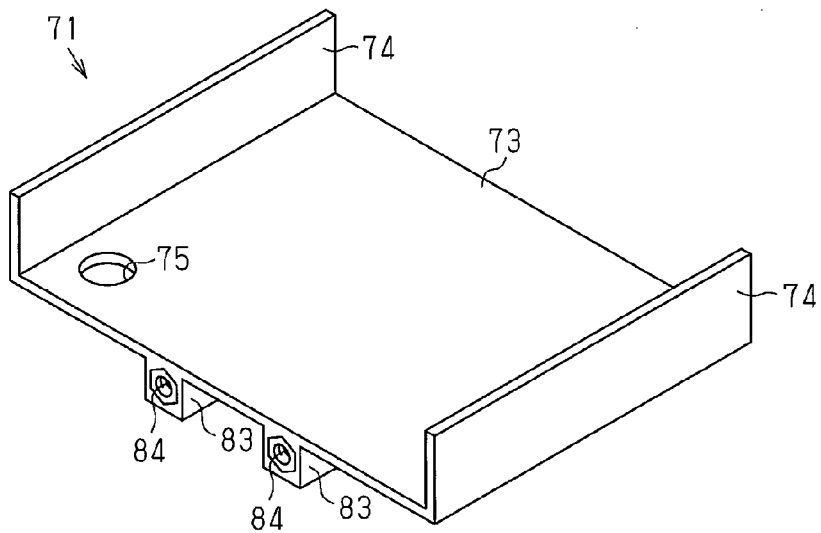
FIG. 4 is a perspective view showing the first cover member shown in FIG. 1.

As shown in FIG. 4, the first cover member 71 includes a rectangular flat board-shaped main body 73. The main body 73 has side walls (upright walls) 74, which extend in the thickness direction from the opposite ends in the longitudinal direction of the main body 73. The main body 73 has a through-hole 75, which extends through the thickness. The through-hole 75 is located in the vicinity of one of the four corners of the main body 73.

The main body 73 has two quadrangular prism-like fixing portions 83 on the surface opposite to the surface on which the side walls 74 are provided (the surface facing the lid member 15). The fixing portions 83 are both located at one of the ends in the transverse direction of the main body 73. The fixing portions 83 are spaced from each other in the longitudinal direction of the main body 76. A nut 84 is embedded in each fixing portion 81, for example, by insert molding. The distance between the nuts 84, which are embedded in the fixing portions 81, (the distance between the centers of the nuts 84) is equal to the distance between the second plate through-holes 68 of the first end plate 61.

Figure 5:
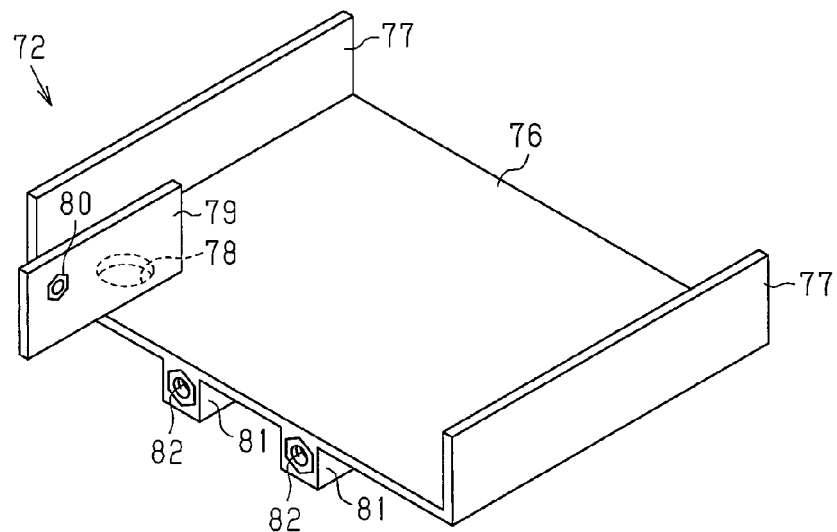
FIG. 5 is a perspective view showing the second cover member shown in FIG. 1.

As shown in FIG. 5, the second cover member 72 includes a rectangular flat board-shaped main body 76. The main body 76 has side walls (upright walls) 77, which extend in the thickness direction from the opposite ends in the longitudinal direction of the main body 76. The main body 76 has a through-hole 78, which extends through the thickness. The through-hole 78 is located in the vicinity of one of the four corners of the main body 76. The main body 76 has a flat board-shaped fixing plate 79, which extends in the thickness direction of the main body 76 from the surface on which the side walls 77 are provided. The fixing plate 79 is located in the vicinity of the through-hole 78. A nut 80 is embedded in the fixing plate 79, for example, by insert molding.

The main body 76 has two quadrangular prism-like fixing portions 81 on the surface opposite to the surface on which the side walls 77 are provided (the surface facing the lid member 15). The fixing portions 81 are both located at one of the ends in the transverse direction of the main body 76. The fixing portions 81 are spaced from each other in the longitudinal direction of the main body 76. The distance between the surfaces of the fixing portions 81 that are on the sides opposite to the surfaces facing each other (the surfaces of the fixing portions 81 that face outward in the longitudinal direction of the main body 76) is shorter than the distance between the surfaces of the pillar members 26 of the battery holder 20 that face each other. A nut 82 is embedded in each fixing portion 81, for example, by insert molding.

The first cover member 71 and the second cover member 72 are arranged such that the corners adjacent to the through-holes 75, 78 are at diagonally opposite positions. In the aligning direction of the battery cells 11, the first cover member 71 is located closer to the first end plate 61, and the second cover member 72 is located closer to the second end plate 62. As shown in FIGS. 1 and 6, the side walls 74 of the first cover member 71 and the side walls 77 of the second cover member 72 are each arranged along the guide portions 27 of the corresponding battery holders 20. The first cover member 71 and the second cover member 72 are not fixed to each other and can be spaced from each other.

As shown in FIGS. 1 and 2, a screw 59 is inserted into each second plate through-hole 68 of the first end plate 61 and is threaded to the nut 84 embedded in the corresponding fixing portion 83 of the first cover member 71. This fixes the first end plate 61 to the first cover member 71.

As shown in FIG. 6, the two fixing portions 81 of the second cover member 72 are located between the two pillar members 26 of the corresponding battery holder 20. The screws 58 inserted into the second through-holes 56 of the fixing plate 51 are threaded to the nuts 82 embedded in the fixing portions 81, so that the fixing plate 51 is fixed to the second cover member 72.

As shown in FIG. 1, a current sensor 85 is placed on the first cover member 71. The current sensor 85 is connected to the battery cells 11. Specifically, the first battery cell ha has a pillar-shaped bus bar 86 on the terminal 16. The bus bar 86 extends through the through-hole 75 of the first cover member 71 and is connected to a connecting terminal 87 of the current sensor 85.

A connecting member 89 is fixed to a connecting terminal 88 of the current sensor 85. The connecting member 89 is connected to a circuit board 90. Electronic components 91 are mounted on the circuit board 90. The electronic components 91 include, for example, semiconductor devices such as field-effect transistors (FETs). The electronic components 91 are connected to each other with conductive traces on the circuit board 90. The circuit board 90 is connected to a connecting member 92. A harness 93 is fixed to the connecting member 92.

A monitoring ECU 94 is placed on the second cover member 72. The monitoring ECU 94 monitors the battery module 10. When an abnormality occurs in the battery module 10 (or in any of the battery cells 11), the monitoring ECU 94, for example, stops discharge. A conductor, which is a pillar-shaped bus bar 100, is inserted in the through-hole 78 of the second cover member 72. The bus bar 100 includes a first pillar portion 101 and a second pillar portion 102. The first pillar portion 101 is connected to the terminal 16 of the second battery cell 11b and extends through the through-hole 78 of the second cover member 72 to protrude upward from the cover member 72. The second pillar portion 102 extends from the distal end of the first pillar portion 101 along the fixing plate 79, that is, in a direction perpendicular to the first pillar portion 101. A harness 104 is fixed to the second pillar portion 102 with a screw 103. The screw 103 is passed through the gap of the U-shaped end of a connecting portion 105 of the harness 104 and the hole of the second pillar portion 102 and is threaded to the nut 80 embedded in the fixing plate 79. This fixes the harness 104, together with the bus bar 100, to the second cover member 72.

Operation of the battery module 10 of the present embodiment will now be described.

In the battery cells 11, films form on the electrodes as the battery cells 11 are used. As the films thicken, the battery cells 11 expand. Since the elastic body 31 is placed between the second end plate 62 and the second battery cell 11b, expansion of the battery cells 11 elastically deforms the elastic body 31. The elastic body 31 is elastically deformed to absorb the load applied to the end plates 61, 62 due to expansion of the battery cells 11.

A battery module 200 of a comparison example will now be described.

Figure 7:
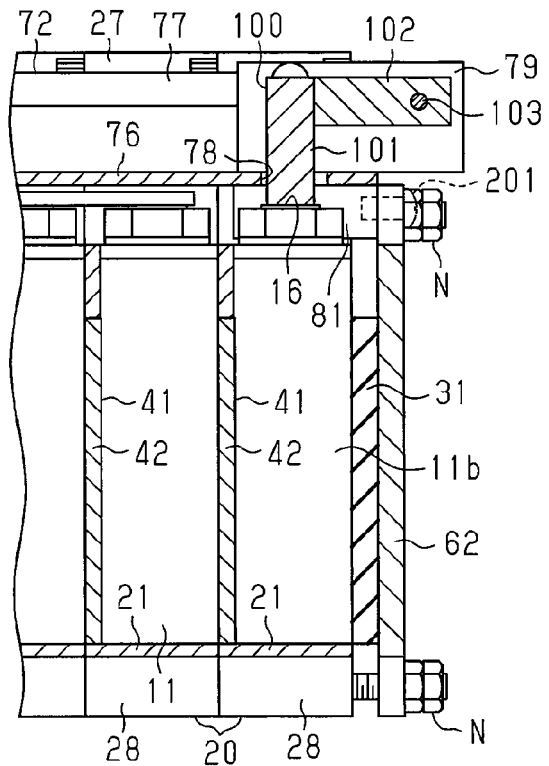
FIG. 7 is a partially cut-away cross-sectional view illustrating a battery module of a comparison example.

As shown in FIG. 7, the battery module 200 of the comparison example does not have the fixing plate 51, and the second cover member 72 is fixed to the second end plate 62. Specifically, screws 201 are passed through the second end plate 62 and threaded to the nuts 82 embedded in the corresponding fixing portions 81 of the second cover member 72, so that the second cover member 72 is fixed to the second end plate 62.

Figure 8:
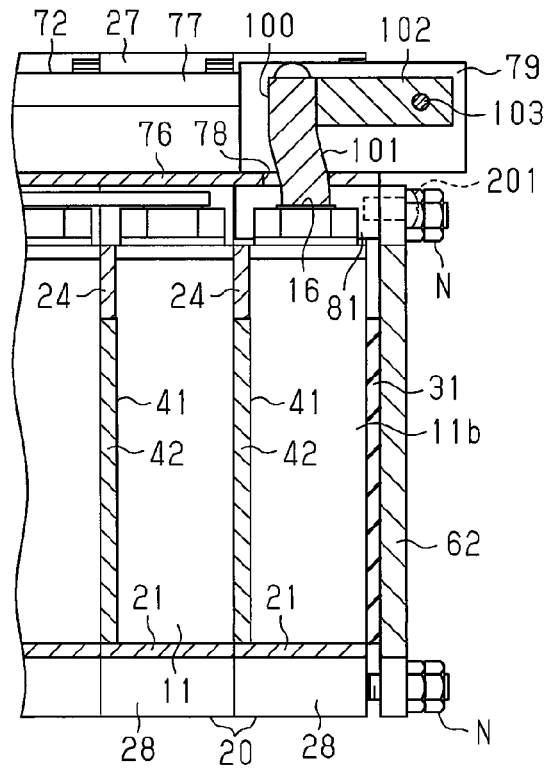
FIG. 8 is a partially cut-away cross-sectional view illustrating the battery module shown in FIG. 7.

As shown in FIG. 8, when the battery cells 11 expand, adjacent the battery cell 11 push each other. The load of the pushing force of the battery cells 11 acts on the elastic body 31 to elastically deform the elastic body 31, so that the battery cells 11 are moved slightly toward the second end plate 62. As the battery cells 11 are moved toward the second end plate 62, the bus bar 100, which is fixed to one of the battery cells 11, is moved integrally. The bus bar 100 is fixed to the second cover member 72. However, since the second cover member 72 is fixed to the second end plate 62, the battery cells 11, the bus bar 100, and the second cover member 72 cannot move integrally. Thus, the stress that accompanies movement of the battery cells 11 concentrates on the bus bar 100. This can bend the bus bar 100, loosen the screws 103, or damage the second cover member 72.

Figure 9:
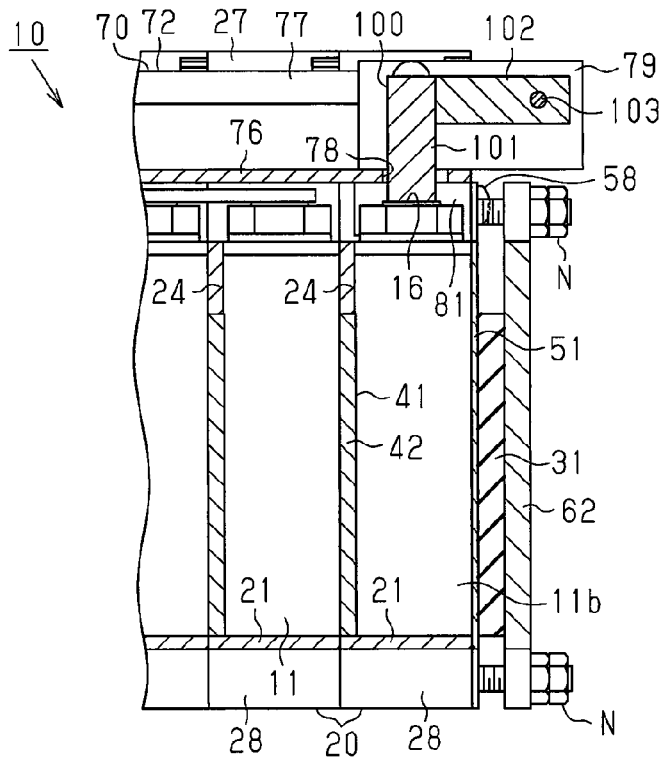
FIG. 9 is an explanatory cross-sectional view illustrating operation of the battery module shown in FIG. 6.

In the present embodiment, the fixing plate 51 and the elastic body 31 are arranged between the second end plate 62 and the battery cells 11 as shown in FIG. 9. The fixing plate 51 is arranged between the elastic body 31 and a battery cell 11 (the second battery cell 11b), and the elastic body 31 is arranged between the fixing plate 51 and the second end plate 62.

Figure 10:
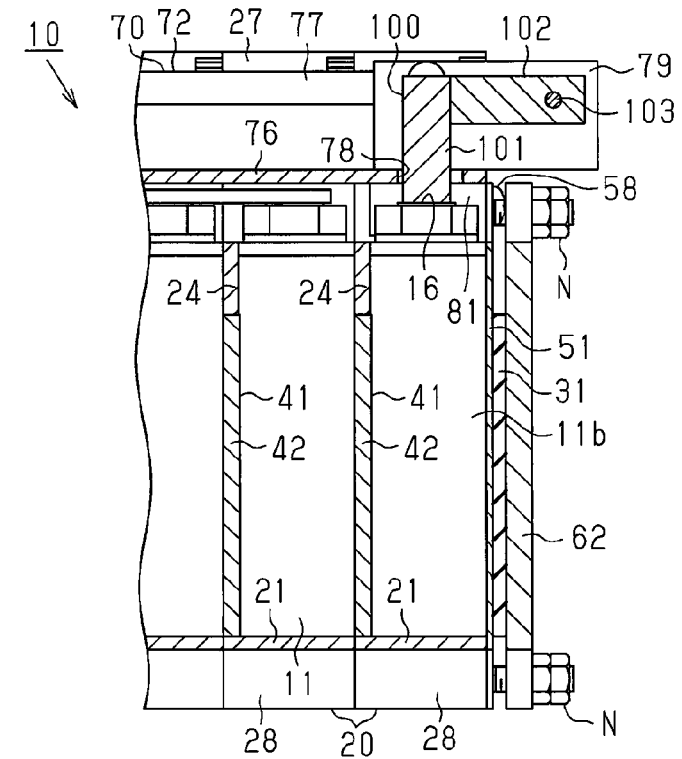
FIG. 10 is an explanatory cross-sectional view illustrating operation of the battery module shown in FIG. 6.

If the battery cells 11 expand and move toward the second end plate 62 as shown in FIG. 10, and the second cover member 72 moves integrally with the battery cells 11, the fixing plate 51, to which the second cover member 72 is fixed, is moved integrally with the second cover member 72. This allows the battery cells 11, the bus bar 100, and the second cover member 72 to move integrally to restrain the bus bar 100 from receiving stress. When the second cover member 72 moves, the side walls 77 are moved along the guide portions 27 of the battery holders 20, so that the second cover member 72 is guided in the aligning direction of the battery cells 11.

In the present embodiment, while the elastic body 31 is provided between the second end plate 62 and the second battery cell 11b, the elastic body 31 is not provided between the first end plate 61 and the first battery cell ha. Thus, the battery cells 11 expand and move slightly, the battery cells 11 move toward the elastic body 31, that is, toward the second end plate 62. Therefore, the second battery cell 11b is moved by a greater amount than the first battery cell 11a. Since the first cover member 71 and the second cover member 72 are not fixed to each other, only the second cover member 72 is moved integrally with the second battery cell 11b as the second battery cell 11b moves. That is, providing the elastic body 31 only between the second end plate 62 and the second battery cell 11b determines the moving direction of the battery cells 11 and allows the first cover member 71 and the second cover member 72 to be spaced from each other. This reduces the influence on the first cover member 71.

The above-described embodiment achieves the following advantages.

(1) The elastic body 31 and the fixing plate 51 are provided between the second end plate 62 and the battery cells 11, and the cover 70 is fixed to the fixing plate 51. Thus, when the battery cells 11 expand, the fixing plate 51 is allowed to move integrally with the second cover member 72 to restrain stress from acting on the bus bar 100. This restrains deformation of the bus bar 100, loosening of the screw 103, and damage to the second cover member 72.

(2) The elastic body 31 is provided between the second battery cell 11b and the second end plate 62 to allow the first cover member 71 and the second cover member 72 to be spaced from each other. When the battery cells 11 expand, the battery cells 11 are allowed to move toward the second end plate 62. This reduces the movement amount of the first battery cell ha and increases the movement amount of the second battery cell 11b. Accordingly, the movement amount of the first cover member 71 is less than that of the second cover member 72. This restrains stress from acting on the bus bar 86.

(3) The side walls 74 of the first cover member 71 and the side walls 77 of the second cover member 72 are each arranged along the guide portions 27 of the corresponding battery holders 20. Thus, when the cover 70 moves, the movement is guided in the aligning direction of the battery cells 11 by the guide portions 27.

The embodiment may be modified as follows.

In the above illustrated embodiment, the cover 70 includes a plurality of cover members 71, 72. However, the cover 70 may include a single cover member. Alternatively, the cover 70 three or more cover members.

As long as the bus bar 100 is fixed to any position of the cover 70, the bus bar 100 does not necessarily need to be fixed to the fixing plate 79. If the bus bar 100 is not fixed to the fixing plate 79, the fixing plate 79 may be omitted.

In addition to the elastic body 31 and the fixing plate 51, which are provided between the second end plate 62 and the second battery cell 11b, additional elastic body 31 and fixing plate 51 may be provided between the first end plate 61 and the first battery cell 11a.

The fixing plate 51 may be fixed to the cover 70 by means other than fixing members such as the screws 58, but may be fixed, for example, by adhesive.

The conductor may be any member that is fixed to the cover 70, and may be, for example, a board-shaped bus bar.

The battery holder 20 does not necessarily need to have the guide portions 27.

The invention claimed is:

1. A battery module comprising:
    a plurality of aligned battery cells, wherein each battery cell has a terminal and a surface on which the terminal is provided;
    a cover, which faces the surfaces of the battery cells on which the terminals are provided;
    a conductor, which is connected to the battery cells and fixed to the cover;
    a first end plate and a second end plate, which hold the battery cells from opposite ends in an aligning direction of the battery cells;
    an elastic body, which is arranged between the second end plate and the battery cell that is adjacent to the second end plate; and
    a fixing plate, which is arranged between the elastic body and the battery cell that is adjacent to the elastic body, wherein
    the elastic body is configured to be elastically deformed to absorb a load that is applied to the first and second end plates as the battery cells expand, and
    the fixing plate is fixed to the cover and is configured to move in the aligning direction of the battery cells together with the cover as the battery cells expand.

2. The battery module according to claim 1, wherein
    the elastic body and the fixing plate are provided only between the second end plate and the corresponding battery cell,
    the cover includes a plurality of cover members, which are arranged in the aligning direction of the battery cells,
    the cover members are allowed to be spaced from each other in the aligning direction of the battery cells as the battery cells expand, and
    of the cover members, the cover member that is closest to the fixing plate is fixed to the fixing plate.

3. The battery module according to claim 1 or 2, further comprising a plurality of battery holders, each of which holds one of the battery cells, wherein
    the battery holders have guide portions arranged along the cover, and the guide portions guide movement of the cover in the aligning direction as the battery cells expand.

\* \* \* \* \*